United States Patent [19]
Izumi

[11] Patent Number: 5,847,785
[45] Date of Patent: Dec. 8, 1998

[54] LIQUID CRYSTAL DISPLAY DEVICE

[75] Inventor: Yoshihiro Izumi, Kashihara, Japan

[73] Assignee: Sharp Kabushiki Kaisha, Osaka, Japan

[21] Appl. No.: 56,539

[22] Filed: Apr. 8, 1998

[30] Foreign Application Priority Data

May 21, 1997 [JP] Japan ................................. 9-131515

[51] Int. Cl.$^6$ .................................................. G02F 1/133
[52] U.S. Cl. ............................................. 349/73; 349/153
[58] Field of Search ....................................... 349/73, 153

[56] References Cited

U.S. PATENT DOCUMENTS 5,106,197  4/1992  Ohuchida et al. ......................... 349/73
5,781,258  7/1998  Dabral et al. ............................. 349/73

FOREIGN PATENT DOCUMENTS

8-184849   7/1996   Japan .
8-220552   8/1996   Japan .
409022004  1/1997   Japan .
409005759  10/1997  Japan .

Primary Examiner—William L. Sikes
Assistant Examiner—James A. Dudek
Attorney, Agent, or Firm—David G. Conlin; Christine C. O'Day; Dike, Bronstein, Roberts & Cushman, LLP

[57] ABSTRACT

A liquid crystal display device includes a large-panel prepared by connecting a plurality of liquid crystal panels side to side on a large substrate, each liquid crystal panel being composed of a TFT substrate and a CF substrate. The TFT substrate and the CF substrate are connected by a combined use of a first seal material of a photo-setting resin formed along connecting sides between the liquid crystal panels and a second seal material made of a thermosetting resin formed along other sides than the connecting sides. As a result, a hardening inferior of the seal material as well as a display inferior of the liquid crystal panel due to the seal material can be prevented.

13 Claims, 7 Drawing Sheets

LIQUID CRYSTAL DISPLAY DEVICE

FIELD OF THE INVENTION

The present invention relates to a direct-sight-type liquid crystal display device for use in, for example, AV (audiovisual) systems, or OA (office automation) systems.

BACKGROUND OF THE INVENTION

Recently, there is an increasing demand for a high-definition large-screen display which is lighter, thinner and less-power-consuming for displays for use in a TV set representing the AV systems intended for home use or the OA systems. Especially, the development of the large-screen displays including a CRT (cathode ray tube), an LCD (liquid crystal display), a PDP (plasma display panel), and an EL (electroluminescent) display, and an LED (light emitting display) has been processing toward practical use.

Among all, the liquid crystal display device is the most advantageous in that: it has the least depth (thickness); it consumes less power; and it has the least depth (thickness); it consumes less power; and it easily displays full color images. Thus, the liquid crystal display has been applied to various fields these days and the development of a large-screen liquid crystal display device has long been expected.

However, it is known that the mortality rate of the liquid crystal display surges when the screen thereof is upsized because of the signal disconnection or imperfect pixels caused during the manufacturing process. Besides, there occurs a problem that a high cost is required due to the complicated process for manufacturing a large-screen liquid crystal display.

In order to eliminate the described problems, a multi-panel screen liquid crystal display device which realizes a large-screen by adopting a large substrate prepared by connecting a plurality of small substrates side to side for at least one of the pair of substrates with electrodes which constitute the liquid crystal display device has been proposed.

However, when adopting the described method of upsizing the screen, it is required to make joints at the connecting section between small substrates less noticeable. To achieve this, inventors of the present invention propose a liquid crystal display device of a multi-panel system in which the joints do not stand out in U.S. patent application No. 08/468,649.

The liquid crystal display device includes a large panel prepared by connecting two liquid crystal panels side to side on a large substrate. On both the front and rear surfaces of the large-screen panel, a pair of polarization plates are formed in such a manner that respective polarizing axes intersect at right angles.

For the described liquid crystal display device, it is required to make the pixel pitch uniform by setting a pixel pitch at the connecting section between the two liquid crystal panels equivalent to a pixel pitch in other regions. If the pixel pitch is not uniform, the connecting section becomes noticeable on the display screen, which lowers a display quality.

Here, the liquid crystal panel is arranged such that a cell is formed in an area surrounded by a seal material in a spacing between the pair of substrates having electrodes which are laminated so as to face each other. Therefore, at the connecting section of the two liquid crystal panels, it is required to form the display area very narrow with high precision.

Therefore, for the seal material to be formed along the sides of the connecting section, it is required to use a material which does not disturb the alignment of liquid crystal molecules, i.e., a material which is very safe to use in view of its effects on the alignment of the liquid crystal molecule. Examples of known such reliable seal material against the alignment of the liquid crystal molecule include an ultraviolet-ray-setting resin.

On one of the pair of the substrates, electric wirings such as signal lines, scanning lines, etc., are formed on the substrate having formed thereon the active elements. These electric wirings are made of metal films, and there arises a gap on the substrate by the film thickness of the metal films. Therefore, in the case where the electric wirings intersect the seal material, when varying a line width of the seal material due to the described gap difference, the pattern of the seal material is disturbed. This causes a degrading of a display quality.

Figure 5:
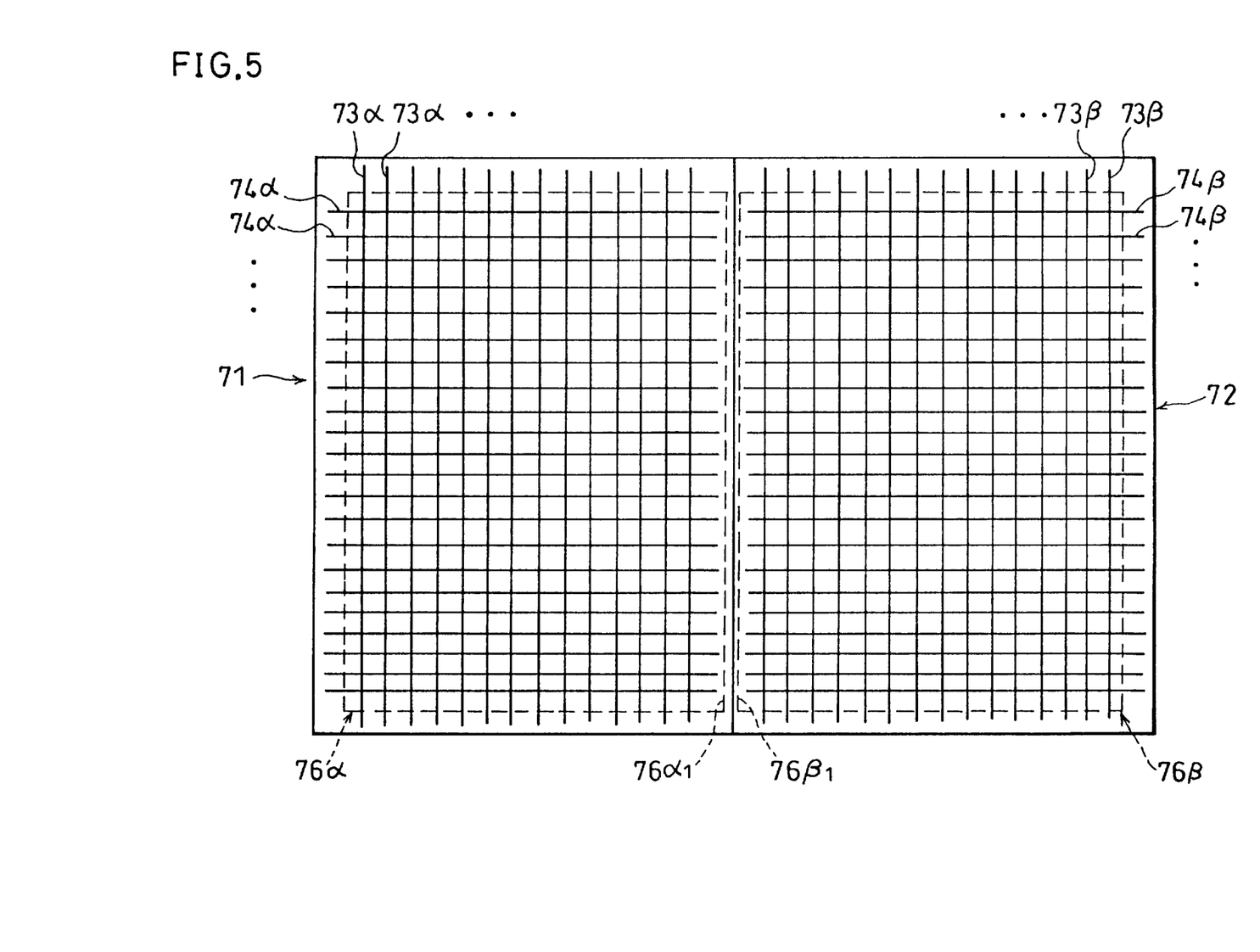
FIG. 5 is an explanatory view showing a large panel of a conventional liquid crystal display device which shows a positional relationship between electric wirings and a seal material formed on two liquid crystal panels which constitute the large panel.

To eliminate the above problem, inventors of the present invention propose in Japanese Unexamined Patent Publication No. 220552/1996 (Tokukaihei 8-220552) a liquid crystal display device wherein the seal material formed along the connecting sides of the connecting section between the liquid crystal panels does not intersect the electric wirings as shown in FIG. 5.

The above liquid crystal display device is also arranged such that two liquid crystal panels 71 and 72 are connected, and its basic structure is the same as the liquid crystal display device disclosed in U.S. patent application No. 08/468,649. The liquid crystal panel 71 is arranged such that the TFT substrate whereon thin film transistors (TFTs) are formed as active elements and the counter substrate are laminated by the seal material 76α and 76α$_1$. Then, the signal lines 73α and the scanning lines 74α are formed on the TFT substrate. Similarly, the liquid crystal panel 72 is arranged such that the TFT substrate and the counter substrate are laminated by the seal materials 76β and 76β$_1$. Then, the signal lines 73β and the scanning lines 74β are formed on the TFT substrate.

The seal materials 76α$_1$ and 76β$_1$ formed along respective connecting sides of the connecting section of the liquid crystal panels 71 and 72 are formed so as not to intersect the electric wirings, i.e., the scanning lines 74α and 74β.

Figure 6:
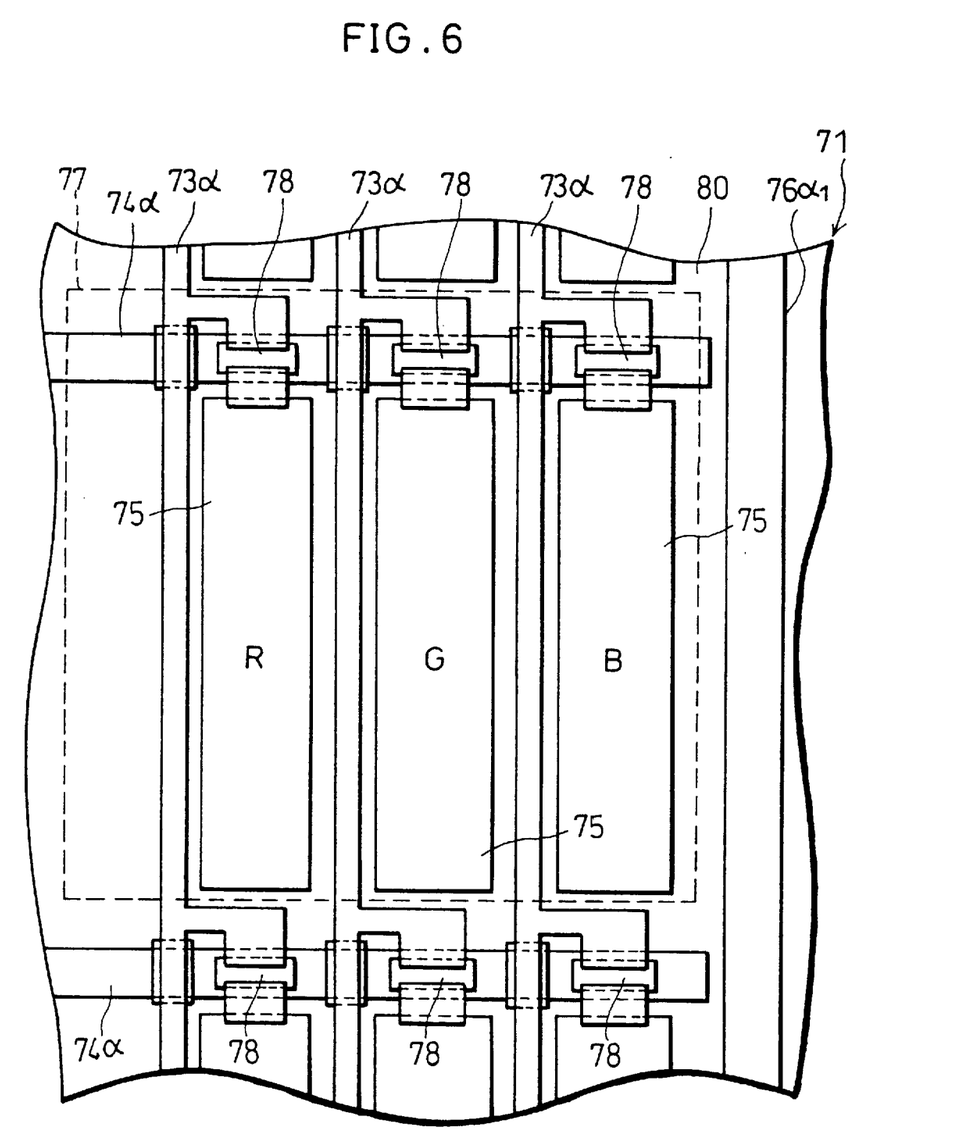
FIG. 6 is a plane view which schematically shows a structure of a pixel unit in a vicinity of joints between the liquid crystal panels of the large panel of FIG. 5.

Specifically, as shown in FIG. 6, on the liquid crystal panel 71, three pixel electrodes 75 corresponding to three color filters in red (R), green (G) and blue (B) formed on the TFT substrate 80 are connected to the signal lines 73α respectively via the TFTs 78. The scanning lines 74α connected to the pixel unit 77 composed of three pixel electrodes 75 do not intersect the seal material 76α$_1$ in the connecting section. Therefore, as shown in FIG. 5, in the connecting section of the liquid crystal panels 71 and 72, the seal materials 76α$_1$ and 76β$_1$ can be made narrow, and can be formed with high precision.

Therefore, in the manufacturing process of the liquid crystal panel, when laminating the TFT substrate and the counter substrate by the seal material, it is required to harden the resin of the seal material by a projection of an ultraviolet ray. Here, when projecting an ultraviolet ray from the side of the counter substrate, i.e., the substrate whereon the color filter (CF) and the black matrix (BM), etc., are formed, the ultraviolet ray as being projected is blocked by the BM formed on the CF substrate and does not reach the seal material. Therefore, the projection of the ultraviolet ray is performed from the side of the TFT substrate via the electrodes.

In the described liquid crystal display device as disclosed by Japanese Unexamined Patent Publication No. 220552/1996 (Tokukaihei 8-220552), the ultraviolet ray is blocked by the BM in the area in which the seal materials $76\alpha_1$ and $76\beta_1$ are formed. However, the patterns of the seal materials $76\alpha_1$ and $76\beta_1$ do not intersect the electric wirings when seen from the side of the TFT substrate. Therefore, by projecting the ultraviolet ray from the side of the TFT substrate to the resin of the seal materials $76\alpha_1$ and $76\beta_1$, the ultraviolet ray can be applied thereto without being blocked. Additionally, the resin of the seal materials $76\alpha$ and $76\beta$ positioned on other sides than the connecting sides can be hardened by projecting an ultraviolet ray through a spacing via the electric wirings formed in a matrix.

However, when upsizing the screen of the liquid crystal display panel, in view of the resistivity of the electric wirings, it is required to increase the width of the electric wirings. However, when adopting the wide electric wirings, a problem arises in that the ultraviolet ray as being projected does not reach some part of the area where the resin of the seal material is formed.

In the liquid crystal display device, for example, in order to realize a display screen of SVGA (Super Video Graphics Array) having a display of a diagonal of 40 inch size, and a resolution of 800×600 Super Video Graphics Array (SVGA), the electric wirings formed on the TFT substrate are required to be not less than around 0.1 mm. In the case of adopting the electric wirings having a width of not more than 0.1 mm, even if the ultraviolet ray is blocked by the electric wirings, the resin of the seal material can be hardened as the ultraviolet ray is curved or reflected. However, when adopting the electric wirings having a width of not less than 0.1 mm, the ultraviolet ray does not reach the resin as being blocked by the electric wirings even if the light is curved or reflected. Therefore, the resin of the seal material remains partially unhardened, thereby causing a hardening inferior of the resin.

In order to counteract the described problems, a method of hardening the resin of the part blocked by the electric wirings has been proposed. The method adopts the seal material made of the ultraviolet-ray-setting resin to which the heat polymerization catalyst is added. In this method, after projecting the ultraviolet ray to the resin of the seal material, the heat treatment is applied to the resin, thereby completely hardening the unhardened part of the resin. However, when adopting the seal material prepared by adding the heat polymerization catalyst to the ultraviolet-ray-setting resin, by the effect of the heat polymerization catalyst, an alignment of the liquid crystal molecules is disturbed in the area of substantially around several hundreds $\mu$m in a vicinity of the seal material.

In the liquid crystal display device of the multi-panel system as disclosed in Japanese Unexamined Patent Publication No. 220552/1996 (Tokukaihei 8-220552), it is required to form the seal materials $76\alpha_1$ and $76\alpha_2$ in the connecting section of the liquid crystal panel in a vicinity of the display area. However, when adopting a material which is less reliable in view of its effects on the alignment of the liquid crystal molecules as the seal material, even the alignment of the liquid crystal molecules in a display area may be disturbed by the seal material, which causes a problem of a degrading of a display quality.

Therefore, like the seal material to be formed in the connecting section between the liquid crystal panels, it is required to adopt a high quality and reliable material in view of its effects on the alignment of liquid crystal molecules for the seal material to be formed in close proximity to the display area. In this point, it is not desirable to adopt the method of adding a heat polymerization catalyst to the ultraviolet-ray-setting resin.

SUMMARY OF THE INVENTION

It is an object of the present invention to provide a large-screen liquid crystal display device which can prevent such problem that a part of a seal material remains unhardened and also prevents a display inferior in a display area due to the seal material.

In order to achieve the above object, a liquid crystal display device of the present invention is characterized by including: a large panel prepared by adjacently connecting a plurality of liquid crystal panels side to side on a plane, each liquid crystal panel including a pair of substrates which are connected by a seal material so as to seal therein a liquid crystal layer, at least one of the pair of substrates having electric wirings formed thereon, wherein a first seal material formed along connecting sides between the liquid crystal panels so as not to intersect the electric wirings is made of a photo-setting resin, and of all seal materials formed along sides other than the connecting sides, a second seal material formed so as to intersect the electric wirings is made of a thermosetting resin.

According to the described arrangements, two different types of seal materials are used for a single liquid crystal panel. Specifically, the first seal material to be formed along the sides where the electric terminals of the liquid crystal panel are not formed, such as the connecting sides is made of a photo-setting resin. In contrast, the second seal material to be formed along the sides where the electric terminals are formed is made of a thermosetting resin. Additionally, in the liquid crystal panel, the first seal material formed along the sides where the electric terminals are not formed is arranged so as not to intersect the electric wirings such as signal lines, scanning lines, etc. Therefore, even if the seal material made of an ultraviolet-ray-setting resin is used, the ultraviolet ray is not blocked by the electric wirings. This permits the ultraviolet ray to reach the resin of the seal material without being blocked, and the resin of the seal material can be hardened completely.

Additionally, the first seal material made of the ultraviolet-ray-setting resin is reliable in view of its effects on the alignment of the liquid crystal molecules in a vicinity of the first seal material. Therefore, even if the first seal material is formed in close proximity to the display area of the liquid crystal panel, such problem as a display inferior, etc., can be avoided.

In contrast, the second seal material to be formed along other sides (where the electric terminals are formed) intersects the electric wirings formed on at least one of the substrates. Therefore, when adopting the photo-setting resin such as an ultraviolet-ray-setting resin for the second seal material, the ultraviolet ray as being projected may be blocked by the electric wirings, thereby presenting the problem that a part of the seal material remains unhardened. However, since the second seal material in the described arrangement is made of the thermosetting resin, the second seal material can be hardened completely with an application of heat.

The second seal material formed along other sides than the connecting sides can be formed slightly apart from the display area of the liquid crystal panel unlike the first seal material to be formed along the connecting sides of the connecting section. Therefore, even if an alignment of the liquid crystal molecules in a vicinity of the second seal material is disturbed by adopting not the ultraviolet-ray-setting resin used in the first seal material but the thermosetting resin, since the second seal material can be formed comparatively apart from the display area of the liquid crystal panel, an occurrence of a display inferior can be avoided.

As described, by adopting a plurality of liquid crystal panels prepared using the seal materials of two different types, a large-screen liquid crystal display device which eliminates the problems of incomplete hardening of the resin of the seal materials can be prevented, and the display inferior in the display area of the liquid crystal panel due to the seal material can be realized.

For a fuller understanding of the nature and advantages of the invention, reference should be made to the ensuing detailed description taken in conjunction with the accompanying drawings.

DESCRIPTION OF THE EMBODIMENTS

The following descriptions will discuss one embodiment of the present invention in reference to figures. It should be noted here that the present invention is not limited to the below-explained preferred embodiment.

Figure 2:
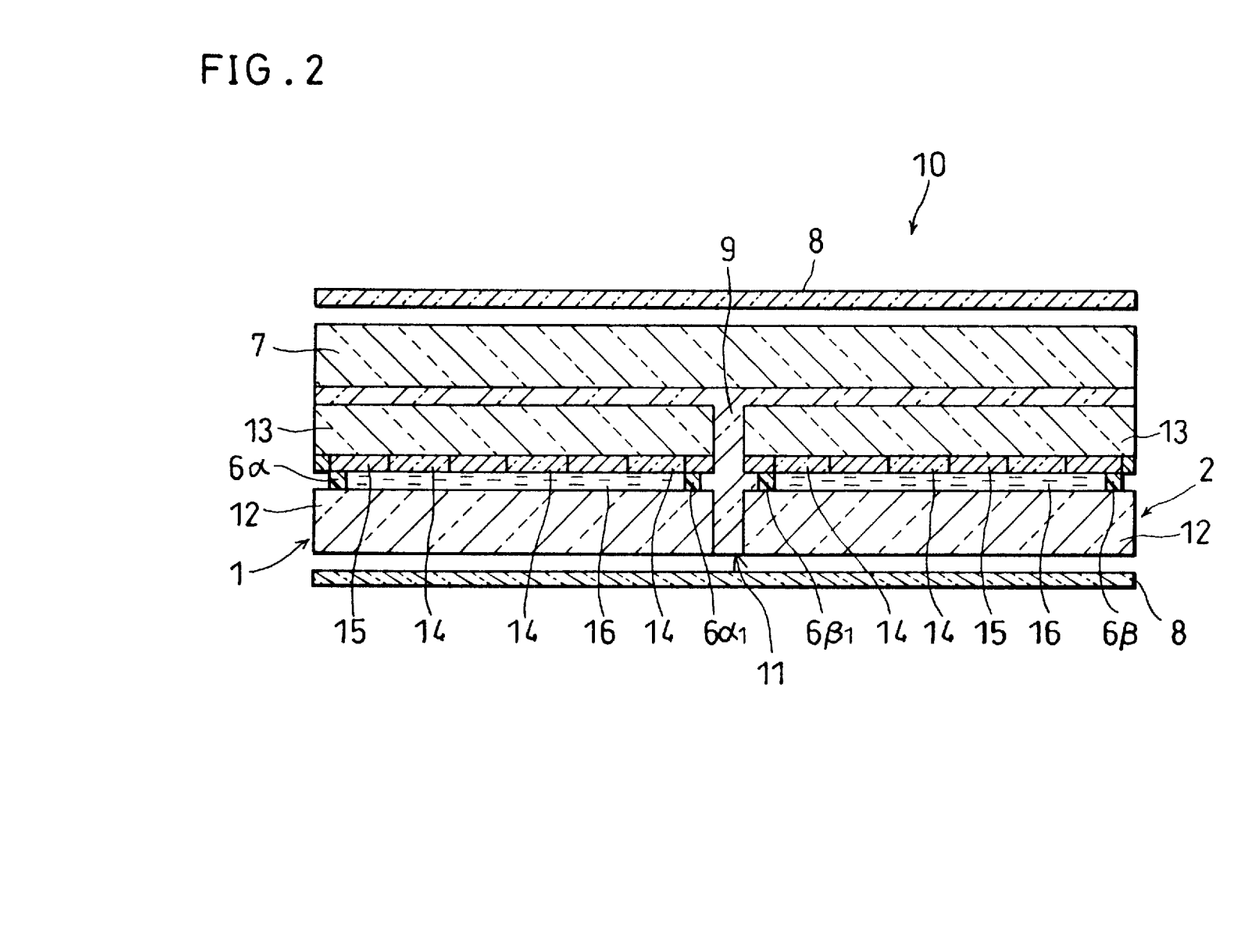
FIG. 2 is a cross-sectional view of the large panel of FIG. 1.

As shown in FIG. 2, a liquid crystal display device in accordance with the present invention is of a multi-panel type which realizes a large screen display by adjacently connecting two liquid crystal panels side to side.

Namely, the liquid crystal display device in accordance with the present embodiment has a large panel 10. The large panel 10 includes a liquid crystal panel 1 and a liquid crystal panel 2 which are adjacently connected side to side on a large substrate 7. In the liquid crystal display device of the present embodiment, a pair of polarizing elements (polarizing plates) 8 (first and second polarizing elements) are formed on entire front and rear surfaces of the large panel 10. The pair of polarizing elements 8 respectively have polarizing axes which intersect at right angles. The liquid crystal panels 1 and 2 are connected onto the large substrate 7 by a refraction factor adjusting material 9. The refraction factor adjusting material 9 is also filled in the connecting section 11 of the liquid crystal panels 1 and 2.

The liquid crystal panel 1 is arranged such that a TFT substrate 12, adopting a thin film transistor (TFT) as an active element, and a CF substrate 12, whereon a color filter (hereinafter referred to as CF) 14 and a black matrix (BM) 15 are formed, are placed so as to oppose each other. The TFT substrate 12 and the CF substrate 12 are laminated using seal materials $6\alpha$ and $6\alpha_1$ (first and second seal materials) so as to seal therein a liquid crystal layer 16. The liquid crystal panel 2 has the same arrangement as the liquid crystal panel 1.

Figure 3:
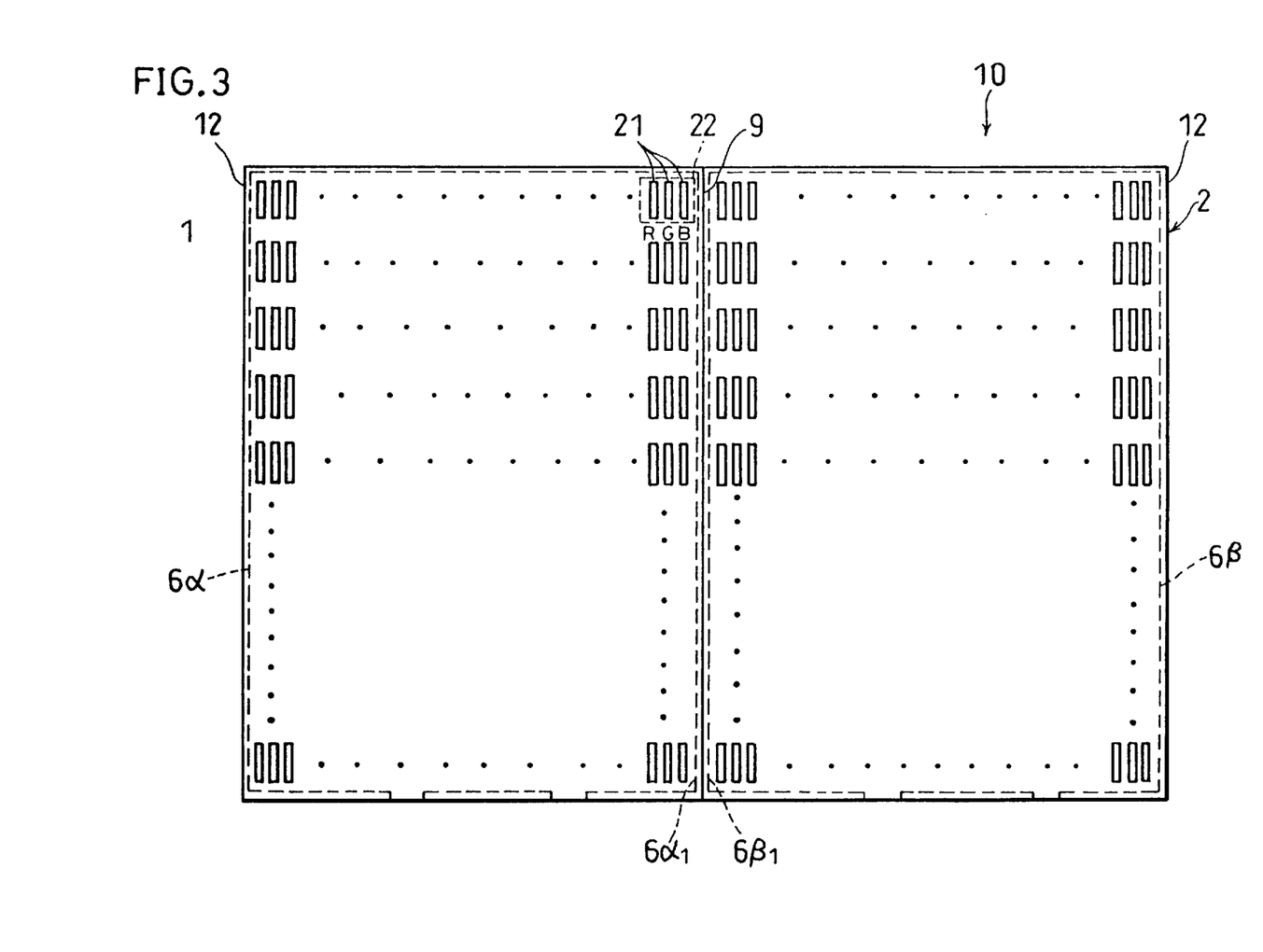
FIG. 3 is an explanatory view, which shows a relationship between pixels and the seal material in the large panel of FIG. 1.

As shown in FIG. 3, in the liquid crystal panels 1 and 2, a plurality of pixel electrodes 21 are formed. Further, three pixel electrodes 21 corresponding to respective CFs 14 (see FIG. 2) in red (R), green (G) and blue (B) form a pixel unit 22. As described, the refraction factor adjusting material 9 is filled in the connecting section of the liquid crystal panels 1 and 2.

Figure 1:
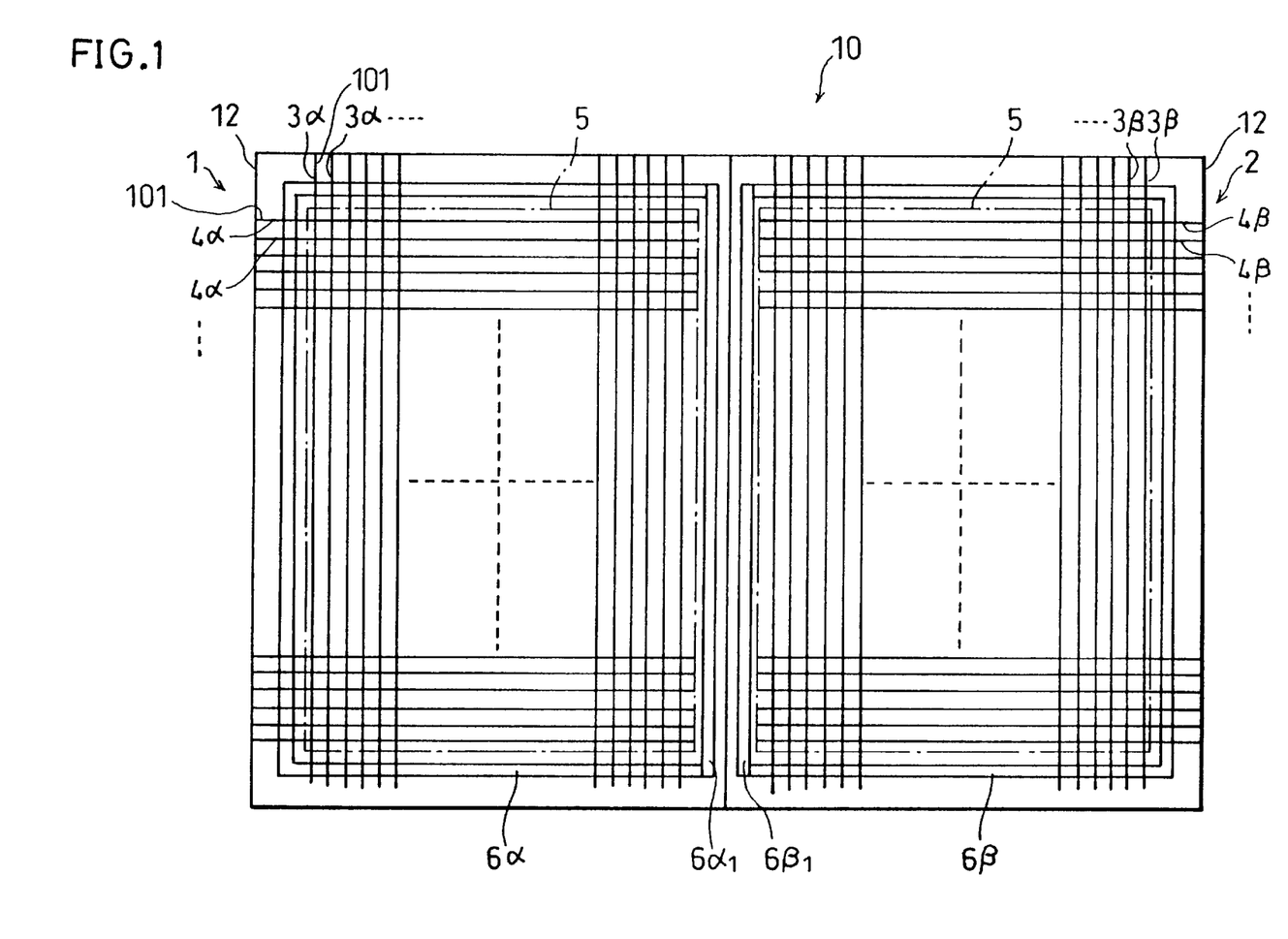
FIG. 1 is an explanatory view of a large panel of a liquid crystal display device in accordance with one embodiment of the present invention, which shows a positional relationship of electric wirings and a seal material formed on two liquid crystal panels which constitute the large panel.

The present embodiment adopts the liquid crystal panels 1 and 2 having the positional relationship shown in FIG. 1, i.e., the seal material and the electric wirings do not intersect only along the connecting sides of the connecting section of the liquid crystal panels 1 and 2. However, it should be noted here that not only the seal material formed along the connecting sides of the connecting section, but also the seal material formed along the side where the electrode terminals 101 are not formed can be arranged so as not to intersect the electric wirings.

On the TFT substrate 12 of the liquid crystal panel 1, a plurality of signal lines $3\alpha$ and a plurality of scanning lines $4\alpha$ are formed in a matrix as electric wirings so as to intersect at right angles. Then, the seal material $6\alpha_1$ (first seal material) is formed along the connecting side of the connecting section between the liquid crystal panels 1 and 2, and a seal material $6\alpha$ (second seal material) is formed along other three sides corresponding to the respective sides of the large panel 10 prepared by connecting the liquid crystal panels 1 and 2 side to side.

A display area 5 in the liquid crystal panel is enclosed by the seal material $6\alpha$ and $6\alpha_1$, and the seal material $6\alpha$ is formed slightly apart from the display area 5. In contrast, the seal material $6\alpha_1$ is formed in close proximity to the display area 5. For convenience in explanations, in FIG. 1, the connecting section between the liquid crystal panels 1 and 2 is shown in a large scale, in practice, however, the pixel pitch in the connecting section is selected to be equivalent to the pixel pitch in the liquid crystal panels 1 and 2.

Figure 4:
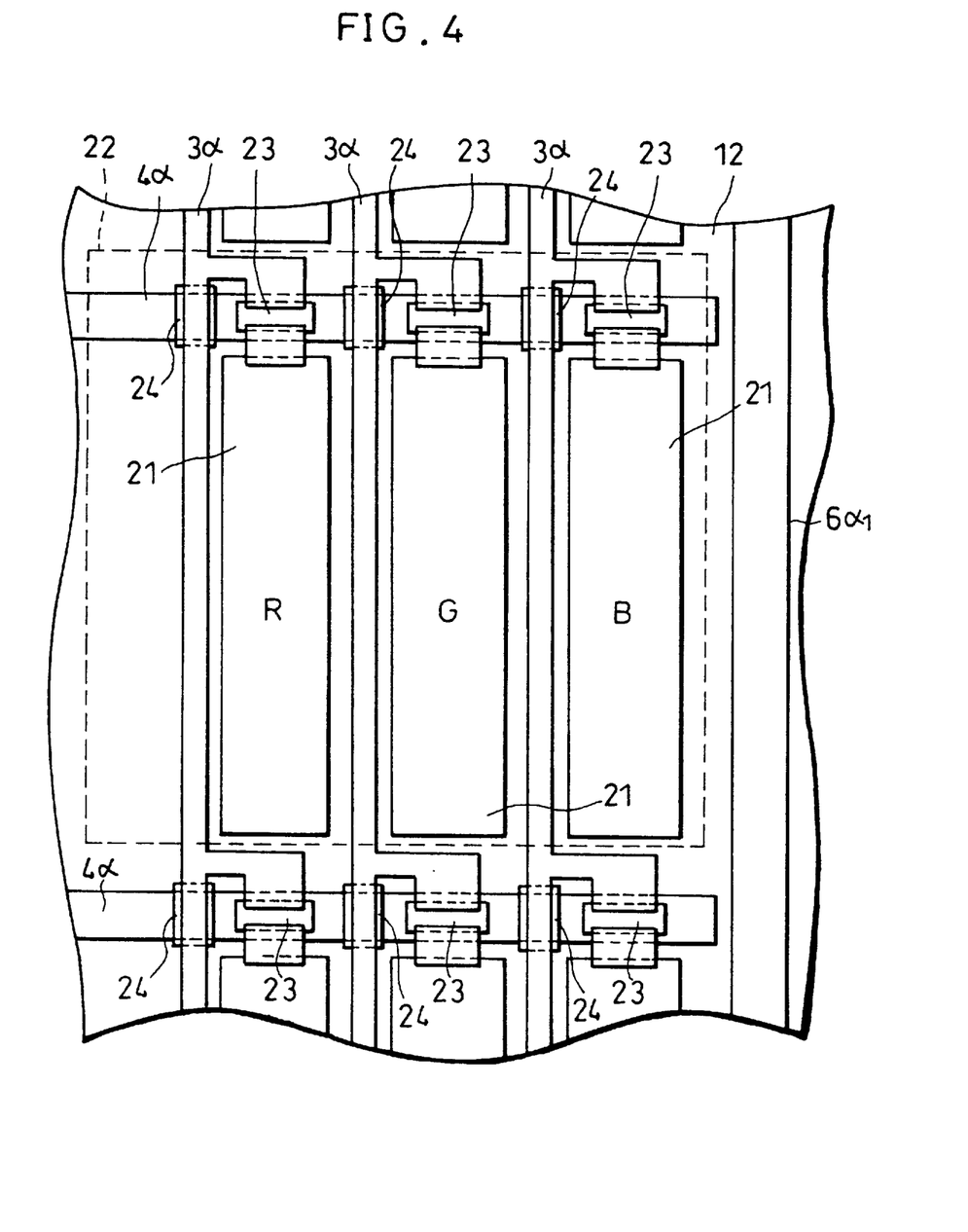
FIG. 4 is a plan view which schematically shows the structure of the pixel unit in a vicinity of joints between the liquid crystal panels which constitute the large panel of FIG. 1.

With regard to the liquid crystal panel 1, the structure of the pixel unit 22 in a vicinity of the connecting section between the liquid crystal panel 1 and the liquid crystal panel 2 will be explained. As shown in FIG. 4, one scanning line $4\alpha$ is formed for one pixel unit 22, and three signal lines $3\alpha$ are formed respectively for three pixel electrodes 21 corresponding to CFs 14 in R, G and B formed on the TFT substrate 12. Further, an insulating film 24 is formed at an intersection between the signal line $3\alpha$ and the scanning line $4\alpha$. The scanning line $4\alpha$ does not intersect the seal material $6\alpha_1$ formed along the connecting side of the connecting section.

The liquid crystal panel 2 has the same arrangement as the liquid crystal panel 1. Namely, signal lines $3\beta$ and scanning lines 4β (electric wirings) are formed in a matrix on the TFT substrate. Then, the seal material 6β$_1$ (first seal material) is formed along the connecting side of the connecting section between the liquid crystal panels 1 and 2, and the seal material 6β (second seal material) is formed along each side of the large panel 10.

The seal materials 6α$_1$ and 6β$_1$ formed along the connecting sides of the connecting section of the liquid crystal panels 1 and 2 are made of a different material from those of the seal materials 6α and 6β. Namely, Namely, the seal materials 6α$_1$ and 6β$_1$ (first seal material) formed along the connecting sides of the connecting section are made of an ultraviolet-ray-setting resin which is reliable in view of its effects on the alignment of the liquid crystal molecules in a vicinity of the seal materials 6α$_1$ and 6β$_1$.

The seal materials 6α$_1$ and 6β$_1$ formed along the connecting sides of the connecting section of the liquid crystal panels 1 and 2 are made of different materials from the seal materials 6α$_1$ and 6β$_1$ formed along the connecting sides of the connecting section between the liquid crystal panels 1 and 2. The seal materials 6α$_1$ and 6β$_1$ (first seal material) formed along the connecting sides of the connecting section are made of the ultraviolet-ray-setting resin that is a reliable material in view of its effects on the alignment of the liquid crystal molecules.

The ultraviolet-ray-setting resin includes acrylic or epoxy resin as a main component and has a polymerization initiator to be activated with an application of an ultraviolet ray. Therefore, such problem that the resin is melted as being heated when hardening the resin can be avoided, and a fine seal material can be formed with high precision.

The seal materials 6α and 6β (second seal material) formed along the other sides than the connecting sides is made of an ultraviolet-ray-setting resin having added thereto a thermosetting resin, such as a heat polymerization catalyst (hereinafter referred to as a combination of thermosetting and ultraviolet-ray-setting resin). Such combination of thermosetting and ultraviolet-ray-setting resin can be hardened also with an application of heat.

When upsizing a screen of the liquid crystal display device, it is required to increase the width of electric lines such as electric wirings formed on the liquid crystal panels 1 and 2, such as signal lines 3α, 3β, scanning lines 4α and 4β, etc. However, when adopting wide electric wirings intersecting the seal materials 6α and 6β, problems arise in that when projecting the ultraviolet ray for hardening the resin serving as the seal materials 6α and 6β, the ultraviolet ray is blocked at the intersection, which causes the problem that the seal materials 6α and 6β remain partially unhardened.

In contrast, when adopting the thermosetting resin such as a combination of thermosetting and ultraviolet-ray-setting resin for the seal materials 6α and 6β, even if the ultraviolet ray is blocked by the electric wirings, etc., and the resin of the seal materials 6α and 6β remains partially unhardened, the unhardened part of the resin of the seal material 6α and 6β can be hardened completely with an application of heat.

As described, according to the liquid crystal display device of the present invention, two different types of seal materials are adopted for the respective purposes with respect to the liquid crystal panel 1 and the liquid crystal panel 2.

The hardening processes of each seal material will be explained through the case of the liquid crystal panel 1. As the hardening processes of the liquid crystal panel 2 are the same as those of the liquid crystal panel 1, explanations thereof shall be omitted here.

In the first step (the step is hereinafter referred to as S), using two different types of resins, the patterns of seal materials 6α and 6α$_1$ are formed on the TFT substrate 12 or the CF substrate 13. In S2, the TFT substrate 12 and the CF substrate 13 are placed so as to face each other and are laminated with a predetermined cell gap between them. Next, in S3, the ultraviolet ray is projected from the side of the TFT substrate 12, and the resin of the seal material 6α$_1$ formed along the connecting side and the seal material 6α formed along other sides than the connecting side are hardened. In S4, with an application of heat, the unhardened part of the seal material 6α can be hardened, thereby completely hardening the resin of the seal material 6α.

In S1, the patterns of the seal materials 6α and 6α$_1$ of two different types may be formed on the same substrate using a dispenser device having a plurality of writing heads. Or the following method may be equally adopted. That is, the pattern of the seal material 6α formed along other sides is printed on the substrate by the screen printing method. Then, only the pattern of the seal material 6α$_1$ formed along the connecting side of the connecting section which requires a high positioning precision is formed using the dispenser device.

As described, as shown in FIG. 1, the seal materials 6α$_1$ and 6β$_1$ are formed so as not to intersect the scanning lines 4α and 4β. Therefore, even when adopting wide electric wirings for the signal lines 3α and 3β, and the scanning lines 4α and 4β, formed on the TFT substrate 12 of the liquid crystal panels 1 and 2, the ultraviolet ray to be projected on the resin such as the seal materials 6α$_1$ and 6β$_1$ is not blocked by the electric wirings. As a result, the resin of the seal materials 6α$_1$ and 6β$_1$ can be hardened completely by projecting the ultraviolet ray in S3.

It should be noted here that not only the seal material formed along the connecting sides of the connecting section but also the seal material formed along the sides where the electric terminals 101 are not formed can be formed so as not to intersect the electric wirings. By adopting the seal material made of the ultraviolet-ray-setting resin for the seal material formed along the sides where the electric terminals 101 are not formed, the effects of hardening the resin completely with an application of an ultraviolet ray can be achieved as achieved from the seal material formed along the connecting sides.

For example, when adopting the acrylic ultraviolet-ray-setting resin as the ultraviolet-ray-setting resin, the resin of the seal materials 6α$_1$ and 6β$_1$ can be hardened completely by projecting an ultraviolet ray having the irradiation intensity of 50 mW/cm$^2$ for 60 sec in S3.

Additionally, the acrylic ultraviolet-ray-setting resin is reliable in view of its effects on the alignment of the liquid crystal molecules. For example, in a polymer dispersed liquid crystal (PDLC) prepared by dispersing a liquid crystal in a polymer, the acrylic ultraviolet-ray-setting resin may be used as the polymer material. This also shows that the acrylic ultraviolet-ray-setting resin hardly affects the storage ratio of the liquid crystal nor disturbs the alignment of the liquid crystal molecules.

Therefore, by adopting the described resin for the seal materials 6α$_1$ and 6β$_1$, the problem of disturbing an alignment of the liquid crystal molecules in a vicinity of the seal materials 6α$_1$ and 6β$_1$ can be prevented. Therefore, like the connecting sides of the connecting section of the liquid crystal panels 1 and 2, even if the seal materials 6α$_1$ and 6β$_1$ are formed in close proximity to the display area 5, an occurrence of a display inferior can be avoided.

As shown in FIG. 1, the seal materials $6\alpha$ and $6\beta$ formed along other sides than the connecting sides are arranged so as to intersect electric wirings for the following reason. That is, the electrode terminals 101 for driving the TFTs 23 (active elements) of the liquid crystal panels 1 and 2 are needed to be connected to the sides.

As described, in the case where the seal materials $6\alpha_1$ and $6\beta$ intersect the electric wirings, when projecting the ultraviolet ray to the resin of the seal materials $6\alpha_1$ and $6\beta$, the ultraviolet ray as being projected is blocked by the electric wirings. Therefore, the part of the seal materials $6\alpha$ and $6\beta$ where the ultraviolet ray do not reach remains unhardened, and the resin of the seal materials $6\alpha$ and $6\beta$ cannot be hardened completely.

In order to eliminate the described problems, for the seal materials $6\alpha$ and $6\beta$, a resin of a combination of the thermosetting and ultraviolet-ray-setting resin to which the heat polymerization catalyst is added is adopted in the present embodiment. Therefore, the polymerization accelerates by the heat polymerization catalyst contained in the resin with an application of heat, and the unhardened part of the resin of the seal materials $6\alpha$ and $6\beta$ can be hardened completely.

On the other hand, in the case where the pattern of the seal materials $6\alpha$ and $6\beta$ is formed by a resin which can be hardened only with an application of heat, at some points of the manufacturing process of the liquid crystal display device, the TFT substrate 12 and the CF substrate 13 are connected only by the seal materials $6\alpha_1$ and $6\beta_1$. Such unstable connection state of the substrates placed so as to face each other in the manufacturing process may require complicated manufacturing processes.

In contrast, in the arrangement of the present embodiment of adopting the resin of the combination of thermosetting and ultraviolet-ray-setting resin that can be hardened both with an application of an ultraviolet ray and an application of heat, the most part of the pattern of the seal material can hardened by projecting thereto an ultraviolet ray. Therefore, the unstable connecting state between the substrates can be avoided, and thus complicated manufacturing processes are not required.

Unlike the seal materials $6\alpha_1$ and $6\beta_1$ formed on the connecting sides of the connecting section, the seal materials $6\alpha$ and $6\beta$ can be formed slightly apart from the display area. Therefore, by adding the heat polymerization catalyst to the resin of the ultraviolet-ray-setting resin, even if alignments of the liquid crystal molecules in a vicinity of the seal materials $6\alpha$ and $6\beta$ are disturbed, the area subjected to the display inferior do not reach the display area 5. Therefore, the resulting liquid crystal display device is free from such problem of a display inferior.

For example, in the case where the liquid crystal panels 1 and 2 are prepared using the TFT substrate 12 on which a metal film having a maximum line width of 0.25 mm is formed for the electric wirings, after projecting the ultraviolet ray in S3 (projecting the ultraviolet ray having an irradiation intensity of 50 mV/cm$^2$ for 60 sec), by applying the heat treatment for one hour at 120° C. in S4, the unhardened part of the seal materials $6\alpha$ and $6\beta$ intersecting the electric wirings can be hardened completely.

However, there is an upper limit for the temperature of the heat treatment to be applied to the seal materials $6\alpha$ and $6\beta$ in S4 since it is preferable to adopt an acrylic ultraviolet-ray-setting resin for the seal materials $6\alpha_1$ and $6\beta_1$ to be formed along the connecting sides of the connecting section. In general, the glass transition temperature Tg of the acrylic resin to be adopted as a seal material is around 120° C. Therefore, when heating the acrylic resin to or above 120° C., the resin may be deformed, or its characteristics may be changed. Therefore, for the combination of thermosetting and ultraviolet-ray-setting resin, it is preferable to adopt resins which can be hardened at temperature below 120° C.

For the seal materials $6\alpha$ and $6\beta$, generally used epoxy thermosetting resin may be used. When adopting the epoxy resin, it is required to project an ultraviolet ray only onto the area of the seal materials $6\alpha_1$ and $6\beta_1$ of the connecting sides of the connecting section. Therefore, the light projection area of the ultraviolet ray emitting device can be specified, and the ultraviolet ray emitting device can be reduced in size. However, for the epoxy resin, similar to the case of adopting the combination of thermosetting and ultraviolet-ray-setting resin, it is required to adopt the resin which is accelerated to be hardened at or below the glass transition temperature Tg of the seal materials $6\alpha_1$ and $6\beta_1$ made of acrylic resin.

As described, by adopting two different types of seal materials according to the respective purposes for a single liquid crystal panel, such problems that the seal materials remain partially unhardened and a display inferior occurs due to the seal materials in the connecting section of the liquid crystal panels can be prevented.

The liquid crystal panel on which the pattern of the seal materials having the above arrangement is prepared using the TFT substrate having formed thereon the signal lines and the scanning lines made of the metal film having a maximum line width of 0.25 mm. As a result, a liquid crystal display device having a display screen of a SVGA (Super Video Graphics Array) having a display of a diagonal of 40 inch size, and a resolution of 800×600 Super Video Graphics Array (SVGA) can be realized.

In the described preferred embodiment, the liquid crystal display device having an arrangement where two liquid crystal panels are connected is adopted; however, the number of the liquid crystal panels is not limited to the above, and it may be arranged so as to connect three or more liquid crystal panels. For example, the present invention is applicable to a liquid crystal display device prepared by adjacently connecting four liquid crystal panels side to side in both a longitudinal direction and a lateral direction in such a manner that adjoining sides are connected with one corner of each panel placed at the center.

Figure 7:
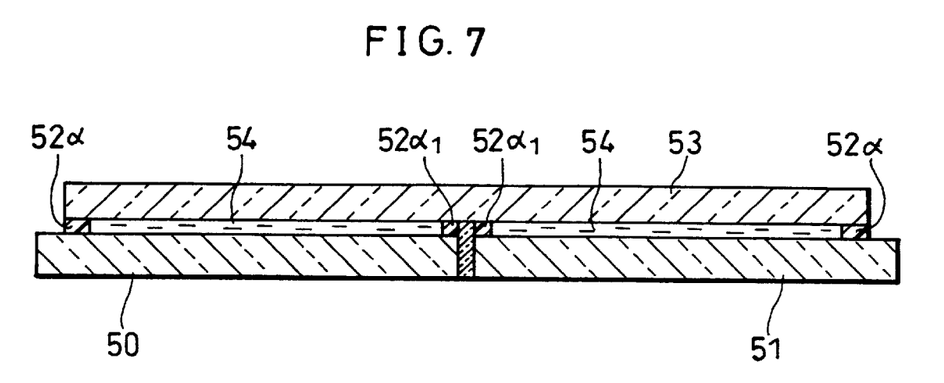
FIG. 7 is a cross-sectional view which shows another structure of the liquid crystal display device of the present invention wherein TFT substrates are connected to the courter substrate using a seal material.

The arrangement of the present invention is also applicable to the liquid crystal. display device of other system than the multi-panel system. For example, like the liquid crystal display device disclosed in Japanese Unexamined Patent Publication No. 184849/1996 (Tokukaihei 8-184849), the present invention may be applicable to the liquid crystal display device having an arrangement where one of the pair of substrates is prepared by connecting a plurality of small substrates. Specifically, the present invention is also applicable to the arrangement as shown in FIG. 7, wherein among the seal materials formed in a spacing between small substrates 50 and 51 which constitute a large substrate and the counter substrate 53 so as to seal therein a liquid crystal layer 54, a seal material $52\alpha_1$ (first seal material) formed along the connecting sides of the connecting area of the substrates 50 and 51 so as not to intersect the electric wirings is made of a photo-setting resin such as an ultraviolet ray setting resin, and of all the seal materials formed on other sides, a seal material $52\alpha$ (second seal material) formed so as not to intersect the electric wirings is made of a thermosetting resin such as combination of thermosetting and ultraviolet-ray-setting resin.

The first liquid crystal display device in accordance with the present invention is arranged so as to include a large panel prepared by adjacently connecting a plurality of liquid crystal panels side to side, each liquid crystal panel including a pair of substrates having sealed therein a liquid crystal layer, at least one of the pair of substrates having electric wirings formed thereon, wherein a seal material formed on the connecting sides of the connecting section between the liquid crystal panels do not intersect the electric wirings, and of all the seal materials formed on respective sides of the liquid crystal panel, a seal material to be formed on the connecting sides of the connecting section is made of an ultraviolet-ray-setting resin, and a seal material to be formed along sides other than the connecting sides of the connecting section is made of a thermosetting resin.

According to the described arrangement, the seal material formed on the connecting sides of the connecting section between the liquid crystal panels is made of an ultraviolet-ray-setting resin which is reliable in view of its effects on the alignments of the liquid crystal molecules in a vicinity of the seal material. On the other hand, the seal material to be formed along the sides other than the connecting sides of the connecting section is made of the thermosetting resin. Namely, with respect to one liquid crystal panel, two different types of the seal material are adopted.

The seal material made of the ultraviolet-raysetting resin is reliable in view of it effects on the alignments of the liquid crystal molecules. Therefore, even if the seal material is formed in close proximity to the display area along the connecting side of the liquid crystal panels, an occurrence of such problem as the display inferior can be prevented.

In contrast, the seal material formed on other sides than the connecting sides intersects the electric wirings and the seal material. Therefore, in the case of adopting the ultraviolet-ray-setting resin as the seal material, when projecting thereto the ultraviolet ray, as the ultraviolet ray is blocked by the electric wirings, the resin remain partially unhardened. However, as the seal material formed on other sides than the connecting sides is made of the thermosetting resin, the unhardened part of the resin of the seal material can be hardened completely with an application of a heat treatment.

Different from the seal material formed on the connecting sides of the connecting section, the seal material formed on other sides can be formed apart from the display area of the liquid crystal panel. Therefore, even if the alignment of the liquid crystal molecules in a vicinity of the seal material is disturbed, as the seal material is formed apart from the display area of the liquid crystal panel, such problem as the display inferior can be avoided.

As described, by adopting two different types of the seal materials for one liquid crystal panel, a generation of the unhardened portion of the resin of the seal material as well as the display inferior of the liquid crystal panel due to the seal material in the connecting section between the liquid crystal panels can be prevented.

The second liquid crystal display device of the present invention based on the first liquid crystal display device is characterized in that the thermosetting resin is a combination of thermosetting and ultraviolet-ray-setting resin prepared by adding a heat polymerization catalyst to the ultraviolet-ray-setting resin.

According to the arrangement of the second liquid crystal display device, the seal material to be formed on other sides than the connecting sides of the connecting section is made of the ultraviolet-ray-setting resin to which the heat polymerization catalyst is added. Therefore, most part of the resin can be hardened except for the part to which the ultraviolet ray does not reach as being blocked by the electric wirings.

To clarify the effects as achieved from the present invention, the comparative arrangement wherein the seal material formed along other sides than the connecting sides is made of a resin which can be hardened only with an application of heat will be considered. In this arrangement, at some points of the manufacturing process of the liquid crystal display device, the pair of the substrates are connected only by the seal materials made of an ultraviolet-ray-setting resin formed along the connecting sides of the connecting section. Such unstable connection state of the substrates placed so as to face each other in the manufacturing process may require complicated manufacturing processes.

The present invention offers a solution to the described problems by adopting a resin which can be hardened both with an application of an ultraviolet ray and an application of heat for the seal material to be formed along other sides than the connecting sides, and the unstable connecting state between the pair of substrates can be suppressed.

Additionally, the unhardened portion of the resin at which the ultraviolet ray is blocked by the electric wirings also can be hardened completely by accelerating the polymerization of the resin with an application of heat.

Furthermore, the seal material formed along other sides than the connecting sides can be formed slightly apart from the display area of the liquid crystal panel unlike the seal material formed along the connecting sides of the connecting section. Therefore, even if the alignment of the liquid crystal molecules in a vicinity of the seal material is disturbed by the heat polymerization catalyst as added, as the seal material can be formed apart from the display area of the liquid crystal panel, a problem of a display inferior can be avoided.

The third liquid crystal display device in accordance with the present invention based on the first or second liquid crystal display device is characterized in that the thermosetting resin is a resin which can be hardened at temperature below a glass transition temperature of the ultraviolet-ray-setting resin.

According to the described arrangement, the heat treatment for hardening the thermosetting resin is applied at temperature not more than the glass transition temperature TG of the seal material made of the ultraviolet-ray-setting resin. Therefore, when applying a heat treatment to the seal material made of the thermosetting resin, a change in characteristics and a deformation of the seal material made of the ultraviolet-ray-setting resin as being heated to or above Tg can be prevented.

The fourth liquid crystal display device of the present invention based on the first, second or third liquid crystal display device is characterized in that the ultraviolet-ray-setting resin is made of an acrylic resin. According to the described arrangement, as the seal material to be formed along the connecting sides of the connecting section of the liquid crystal panels, the acrylic ultraviolet-ray-setting resin is adopted. As this permits the disturbances on the alignment of the liquid crystal molecules in a vicinity of the seal material to be suppressed, a natural display screen can be realized without having noticeable joints, thereby achieving a still improved display quality of the liquid crystal display device.

The invention being thus described, it will be obvious that the same may be varied in many ways. Such variations are not to be regarded as a departure from the spirit. and scope of the invention, and all such modification as would be obvious to one skilled in the art are intended to be included within the scope of the following claims.

What is claimed is:

1. A liquid crystal display device, comprising:

a large panel prepared by adjacently connecting a plurality of liquid crystal panels side to side on a plane, each liquid crystal panel including a pair of substrates which are connected by a seal material so as to seal therein a liquid crystal layer, at least one of said pair of substrates having electric wirings formed thereon, wherein a first seal material formed on connecting sides between the liquid crystal panels so as not to intersect the electric wirings is made of a photo-setting resin, and of all seal materials formed on sides other than the connecting sides, a second seal material formed so as to intersect the electric wirings is made of a thermosetting resin.

2. The liquid crystal display device according to claim 1, wherein:

said photo-setting resin is an ultraviolet-ray-setting resin.

3. The liquid crystal display device according to claim 2, wherein:

said ultraviolet-ray-setting resin is an acrylic resin.

4. The liquid crystal display device according to claim 2, wherein:

said ultraviolet-ray-hardening resin is an epoxy resin.

5. The liquid crystal display device according to claim 1, wherein:

said second seal material is formed on a side where electric terminals of the electric wirings are formed.

6. The liquid crystal display device according to claim 1, wherein:

said thermosetting resin is hardened at temperature below a glass transition temperature of the ultraviolet-ray-setting resin.

7. The liquid crystal display device according to claim 1, wherein:

said thermosetting resin is a combination of thermosetting and ultraviolet-ray-setting resin including a heat polymerization catalyst.

8. The liquid crystal display device according to claim 7, wherein:

the combination of thermosetting and ultraviolet-ray-setting resin is hardened at temperature below a glass transition temperature of the ultraviolet-ray-setting resin.

9. The liquid crystal display device according to claim 1, wherein:

said seal material formed along other sides than the connecting sides of the liquid crystal panels is formed apart from a display area so as to avoid its effects on an alignment of liquid crystal molecules.

10. The liquid crystal display device according to claim 1, wherein:

a first polarizing element provided on substantially an entire front surface of said large panel, said first polarizing element having a first polarizing axis; and a second polarizing element provided on substantially an entire rear surface of said large panel, said second polarizing element having a second polarizing axis which intersects said first polarizing axis at right angles.

11. The liquid crystal display device according to claim 1, wherein:

said plurality of liquid crystal panels are laminated on a large substrate by a refraction factor adjusting material, and said refraction factor adjusting material is filled in a connecting section of said plurality of liquid crystal panels.

12. A liquid crystal display device, comprising:

a large substrate prepared by adjacently connecting side to side a plurality of small substrates having electric wirings formed thereon; and a counter substrate placed so as to face said large substrate, wherein a first seal material formed on a connecting side of each small substrate so as not to intersect the electric wirings is made of a photo-setting resin, and of all seal materials formed on other sides than the connecting side, a second seal material formed so as to intersect the electric wirings is made of a thermosetting resin.

13. A liquid crystal display device, comprising:

a liquid crystal display panel having a pair of substrates which are connected by a seal material so as to seal therein a liquid crystal layer, at least one of said pair of substrates having electric wirings formed thereon, a first seal material of said seal material, formed so as not to intersect the electric wirings is made of a photo-setting resin, and a second seal material of said seal material formed so as to intersect the electric wirings is made of a thermosetting resin.

* * * * *